April 19, 1960 W. G. EVANS 2,932,954
ILLUMINATING AND HEATING AND COOLING PANEL MEMBER
Filed Oct. 17, 1958

WITNESSES
John E. Heasly, Jr.
Charles L. Menzemer

INVENTOR
William G. Evans
BY
Frederick Shoppe
ATTORNEY

United States Patent Office 2,932,954
Patented Apr. 19, 1960

2,932,954

ILLUMINATING AND HEATING AND COOLING PANEL MEMBER

William G. Evans, Monroeville, Pa., assignor to Westinghouse Electric Corporation, East Pittsburgh, Pa., a corporation of Pennsylvania Application October 17, 1958, Serial No. 767,960

6 Claims. (Cl. 62—3)

The present invention relates to a composite panel member for both illuminating and heating or cooling a predetermined space.

The object of the present invention is to provide a panel member for controlling the illumination intensity and the temperature within a space.

Another object of the invention is to provide a composite panel member in which an electroluminescent panel is disposed on one surface in cooperative relation with thermoelectric devices for controlling the temperature at the one said surface.

Other objects of the present invention will, in part, be obvious and will, in part, appear hereinafter.

Figure 1:
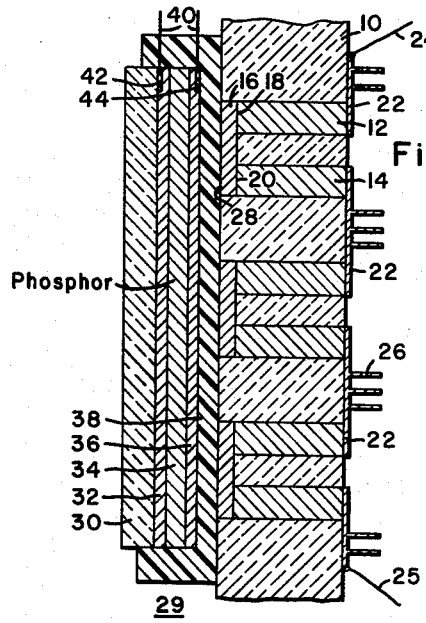
Figure 3:
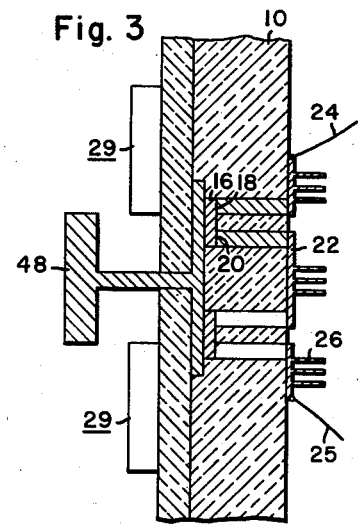
Figure 2:
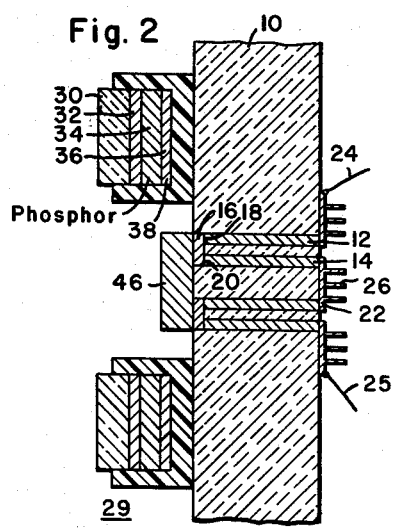
Figure 4:
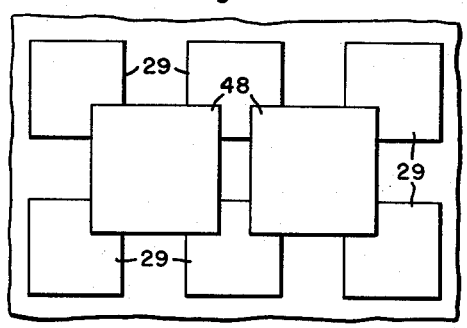
Figure 5:
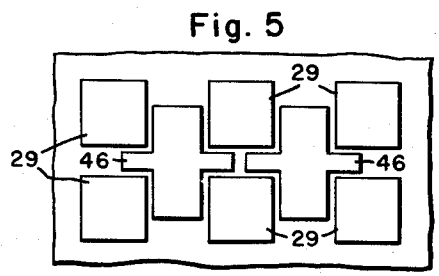

For a better understanding of the nature and objects of the present invention, reference should be had to the following detailed description and drawings, in which:

Figs. 1, 2, and 3 are fragmentary side views in cross-section of several configurations of the panel member of this invention; and Figs. 4 and 5 are front views of possible surface configurations of the panel member of this invention.

In accordance with the present invention and attainment of the foregoing objects, there is broadly provided a panel member capable of both illuminating and heating and cooling a space, the panel member being comprised of (1) a thermal insulating material, (2) thermoelectric members disposed in the thermal insulating material, (3) heat exchange means associated with the junctions of the thermoelectric members at both surfaces and exposed from at least one surface of the panel member, and (4) an electroluminescent member disposed on the said one surface of the panel member in cooperative relationship with the thermal radiating means.

More specifically and with reference to Fig. 1, there is illustrated a thermal insulating panel 10, which may be a wall, a partition, or the like, so formed as to provide at least a portion of the boundary of the space in which the illumination and temperature is to be controlled. The panel member 10 is constructed so as to permit the disposition therein of positive thermoelement members 12 and negative thermoelements 14 which form a thermoelectric device. An electrically conductive strip 16 comprised of a suitable metal for example, copper, aluminum, steel, silver, and mixtures and alloys thereof, is joined to an end face 18 of each member 12 and an end face 20 of each member 14 within the panel so as to provide good electrical and thermal contact therewith. In the event the thermoelements are non-metals, the end faces 18 and 20 may be coated with a thin layer of a metal, for example, by vacuum evaporation or by use of ultrasonic brazing, whereby good electrical contact and thermal adherence thereto is obtained. The metal strip 16 may be readily brazed or soldered to the metal coated end faces 18 and 20. A second metal strip 22 which may be comprised of any suitable metal, for example, copper, steel, silver, aluminum, and mixtures and alloys thereof, is attached by suitable means such as soldering to the other end of the thermal element 12 and connects the positive thermal element of one pair of thermal elements with the negative element of a second pair of elements. The strip 22 is attached at its extremities to a direct electrical current conductors 24 and 25 connected to a source of direct current (not shown). Heat exchange means comprising thermal radiating fin members 26 comprised of any suitable metal, for example, copper, steel, aluminum, and mixtures and alloys thereof, are disposed along the surface of the metal strips 22 and serve to conduct heat or cold to or from the thermal elements 12 and 14. In place of the fin members 26, there may be employed ducts or conduits in which water or air may be conveyed in heat exchange relation to the metal strips 22. There may be fins in such conduits to effect satisfactory heat interchange. It will be appreciated that the ducts or conduits may be embedded in the back surface of the panel member whereby there will be no exposed projecting portions such as the fin members.

Each metal strip 16 is in intimate heat conducting contact with an electroluminescent panel 29. A suitable electroluminescent panel is comprised of a glass plate 30 having a transparent electrically conductive surface 32 over which a thin layer of phosphor-impregnated dielectric material 34 is disposed, and a metal or other electrically conducting backing member 36 is in intimate contact with the phosphor material. An electrical insulation layer 38 comprised of any suitable electrical insulating material, for example, glycidyl polyether resin, polyester resin, and the like is disposed about and encloses the layers 32, 34 and 36. Conductors 40 connected to a source of alternating electrical current (not shown) are attached to the glass plate 30 by a contact 42 and to the metal strip 36 by a contact 44.

The glass layer 30 may be comprised of any commercially available glass, for example, that grade of glass commercially available under the designation "window glass." The transparent conductive surface 32 may be provided upon one surface of the glass 30 by heating the glass 30 and exposing it, while hot, to vapors of the chlorides of silicon, tin, or titanium, and afterwards placing the treated glass in a slightly reducing atmosphere. The conducting surface 32 may also be prepared by coating the surface of the glass member 30 with a mixture of stannic chloride, absolute alcohol and glacial acetic acid. The phosphor-impregnated layer 34 may be a phosphor comprising copper activated zinc sulfide in the form of fine particles embedded in plasticized nitrocellulose.

The metal layer 36 is preferably comprised of a good reflecting metal, such as aluminum, or chromium, which will not react appreciably chemically with the phosphor layer. The metal layer is preferably of low resistance and can be applied in any convenient manner, taking care not to damage the phosphor layer. Good results have been obtained by vacuum deposition of the metal layer. The layer of electrical and thermal insulation 38 is disposed about the layers 32, 34, and 36, after the formation of the electroluminescent member. Satisfactory results have been achieved when the layer 38 is allowed to extend above the periphery of the several layers comprising the electroluminescent panel and terminating on the periphery of the glass member 30.

In operation of the panel member, of the type illustrated in Fig. 1, direct current passes through the conductor 24 to the first metal strip 22 and passes through the positive thermoelectric element 12 to the metal strip 16, back to the negative thermoelectric element 14, again through a second strip 22, and to the next positive thermoelectric element 12 and so on, and the circuit is completed through conductor 25. The passage of the direct current between the positive element 12 and the negative element 14 effects either heating or cooling at the junction surfaces 18 and 20, depending upon the direction of the flow of the direct electrical current. Heat is transmitted through the metal member 16 to or from the electroluminescent panel member and thereby heating or cooling is effected therefrom into the space whose temperature it is desired to control.

The electroluminescent member is energized by passing alternating electrical current through the conductor 40 to the contacts 42 on the glass member 30 and to the contacts 44 on the metal member 36 causing the electroluminescent member to become illuminated. The color of the electroluminescent panel is controlled by the frequency of the alternating current flowing thereinto. For example, if the alternating current is of a frequency in the range of 60 to 400 cycles, the illumination will be of a greenish nature, if the alternating current is of the frequency of 7000 to 10,000 cycles the illumination will be of a bluish nature. Since the color of the illumination from panel and the operation of the thermoelectric element may be controlled independently it can be appreciated that one can control the color of the panel to correspond with the function of the thermoelectric element, for example, if one is cooling the space, the panel may have a greenish tint, if however, one is heating the space by increasing the frequency of the alternating current flowing to the electroluminescent member one can have illumination of a warm color, such as pink or red.

With reference to Fig. 2, there is illustrated a panel having surfaces where the electroluminescent panel is arranged in a configuration associated with the thermoelectric elements so as to provide improved characteristics. In such an embodiment of this invention, heat is either conducted into or away from the space to be controlled by a thermal radiator plate 46, which may be comprised of any suitable metal for example, copper, steel, silver, aluminum, and mixtures and alloys thereof. For cooling purposes in particular, if moisture condenses, it will do so primarily on plate 46 and the electroluminescent panel will not be affected.

With reference to Fig. 3, there is illustrated another embodiment of this invention in which a thermal radiator plate 48 is disposed in a position in advance of and spaced away from the electroluminescent panel. Practical experience has shown that when the panel of this invention is employed to cool a space, a certain amount of moisture condensation appears on either the electroluminescent screen or the radiator plate which is used to absorb the heat from the space. If, for practical reasons of operation, it is desired that this moisture not collect on the electroluminescent screen, the plate 48 is disposed in advance of the electroluminescent panel and the moisture will collect thereupon.

With reference to Fig. 4, there is illustrated a front view of a wall comprising a plurality of electroluminescent panels 29 associated with radiator plates 48 in the manner illustrated in Figure 3.

With reference to Fig. 5, there is illustrated another possible wall configuration employing separate electroilluminescent panels 29 and radiator plates 46 following the Fig. 2 arrangement. It will be noticed that in Fig. 5, the radiator plates are disposed in the area between the electroluminescent panels. Both radiators 46 and electroluminescent panels 29 are flush with the wall surface. It will be appreciated that while the drawings illustrating this invention show a few thermoelectric elements, a greater number of pairs of positive and negative members may be joined electrically in series or in parallel or both to attain the necessary capacity to handle the space being heated or cooled.

Accordingly, it will be apparent that the present invention produces a unitary structural panel wherein both illuminations and heating or cooling means are associated to enable a suitable control of the light and the temperature of a room or other space.

It will be appreciated that the above description and drawing are only exemplary and not exhaustive of the invention.

I claim as my invention:

1. A unitary panel member capable of both illuminating and heating and cooling a space, the panel member comprising thermal insulation, thermoelectric members disposed in the thermal insulation, heat exchange means attached to the junctions of the thermoelectric members and exposed from at least one surface of the panel member, and an electroluminescent phosphor member mounted and disposed on said one surface of the panel member in cooperative spaced relation to the thermal radiating means so that the illumination from the electroluminescent panel radiates into the space without substantial restriction from the heat exchange means, and the heat exchange means heats and cools the space efficiently.

2. A unitary panel member capable of both illuminating and heating and cooling a space, the panel member comprising thermal insulation, a plurality of thermoelectric members disposed in the thermal insulation with one pair of similar junctions of each thermoelectric member disposed near one surface of the panel member while the other pair of similar junctions of each member being disposed near the other surface of the panel member, an electroluminescent phosphor panel mounted upon the panel member and disposed in thermally conducting contact with said one pair of junctions whereby heat is conducted readily through the electroluminescent panel to and from said one junction of the thermoelectric member and radiating means attached to said other pair of similar junctions and exposed at the other surface of the panel member.

3. A unitary panel member capable of both illuminating and heating and cooling a space, the panel member comprising thermal insulation, a plurality of electroluminescent phopshor members mounted upon and disposed in spaced relation on a first surface of the panel member, thermoelectric members disposed in the panel member, thermal radiating means attached to the junctions of the thermoelectric members and exposed from both surfaces of the panel, thermal radiating means on said first surface being disposed in the spaces between and adjacent to said electroluminescent members and in cooperative spaced relationship therewith so that the illumination from the electroluminescent panel radiates into the space without substantial restriction from the thermal radiating means, and the thermal radiating means heats and cools the space efficiently.

4. A unitary panel member capable of both illuminating and heating and cooling a space, the panel member comprising thermal insulation, a plurality of electroluminescent phosphor members mounted upon and disposed in spaced relation on a first surface of the panel member, thermoelectric members disposed in the panel member, thermal radiating means attached to the junctions of the thermoelectric members and exposed from both surfaces of the panel, the thermal radiating means on the said first surface being disposed between, and in advance of and spaced apart from said electroluminescent members and in cooperative spaced relationship therewith so that the illumination from the electroluminescent panel radiates into the space without substantial restriction from the thermal radiating means, and the thermal radiating means heats and cools the space efficiently.

5. A combined panel heating and cooling, and lighting system for a room, said system comprising a panel member, said panel member being comprised of a thermal insulating material, said panel member having a surface exposed to said room, a plurality of thermoelectric members disposed within said panel member, said thermoelectric members being adapted to sequentially heat and cool the room by the passage of a direct electric current through said members, and a plurality of electroluminescent phosphor members being adapted to illuminate said room by the passage of an alternating electric current therethrough disposed upon said surface of said panel, said electroluminescent members being in contact with said thermoelectric members and serving as a conduit of heat between said room and said thermoelectric members.

6. A combined panel heating and cooling, and lighting system for a room, said system comprising a panel member, said panel member being comprised of a thermal insulating material, said panel having a surface exposed to said room, a plurality of thermoelectric members disposed through said panel member and protruding from both surfaces of the panel, said thermoelectric members being adapted to sequentially heat and cool the room by the passage of a direct electric current through said members, and a plurality of electroluminescent phosphor members being adapted to illuminate said room by the passage of an alternating electric current therethrough disposed upon said surface of the panel in cooperative relationship with said thermoelectric members.

References Cited in the file of this patent

UNITED STATES PATENTS

| | | |
|---|---|---|
| 2,096,991 | MacMaster | Oct. 26, 1937 |
| 2,773,216 | Edmonds | Dec. 4, 1956 |
| 2,844,638 | Lindenblad | July 22, 1958 |
| 2,847,602 | Michlin | Aug. 12, 1958 |